United States Patent

[11] 3,623,597

[72] Inventor Charles J. Arndt
 Marion, Ohio
[21] Appl. No. 46,183
[22] Filed June 15, 1970
[45] Patented Nov. 30, 1971
[73] Assignee Harsco Corporation
 Camp Hill, Pa.

[54] CONVEYOR UNIT MOUNTING SYSTEM
 7 Claims, 5 Drawing Figs.
[52] U.S. Cl. .................................................. 198/109,
 198/233
[51] Int. Cl. .................................................. B65g 41/00
[50] Field of Search ........................................... 198/109,
 233, 113; 214/83.26

[56] References Cited
 UNITED STATES PATENTS
 3,184,045 5/1965 Fry .............................. 198/233
 2,501,448 3/1950 Lockwood .................... 198/109
 3,473,679 10/1969 Weichel ...................... 214/83.26 X
 FOREIGN PATENTS
 660,792 4/1963 Canada ........................ 198/233

Primary Examiner—Edward A. Sroka
Attorneys—Ronald L. Engel, Daniel W. Vittum, Jr., Gomer W. Walters and John A. Waters ABSTRACT: An improved conveyor system for conveying building materials such as brick, stone, roofing materials, mortar, concrete mix and the like includes first and second conveyor support members pivotably joined at one end of each to form a conveyor unit which may be folded at approximately its center. A mechanically spliced conveyor belt is supported by both the first and second conveyor support members and is driven in continuous movement by an appropriate drive means. The conveyor unit is mounted on a front-loading vehicle typically comprising a body riding on wheels or treads. Pivotably mounted to the body is a supporting assembly and scoop arrangement capable of being hydraulically rotated about a horizontal axis by hydraulic means. Firmly mounted to the supporting assembly is a vertical support structure. Mounted on the vertical support structure adjacent one end is the first conveyor support member; with the second conveyor support member being partially mounted to the same end of the first conveyor support member. Hydraulic jack members are attached to the supporting assembly and the second conveyor support member to provide means to rotate the second conveyor support member about a horizontal axis at the point of attachment of the first and second conveyor support member.

PATENTED NOV 30 1971

INVENTOR.
CHARLES J. ARNDT
BY *Daniel W. Vittum Jr.*

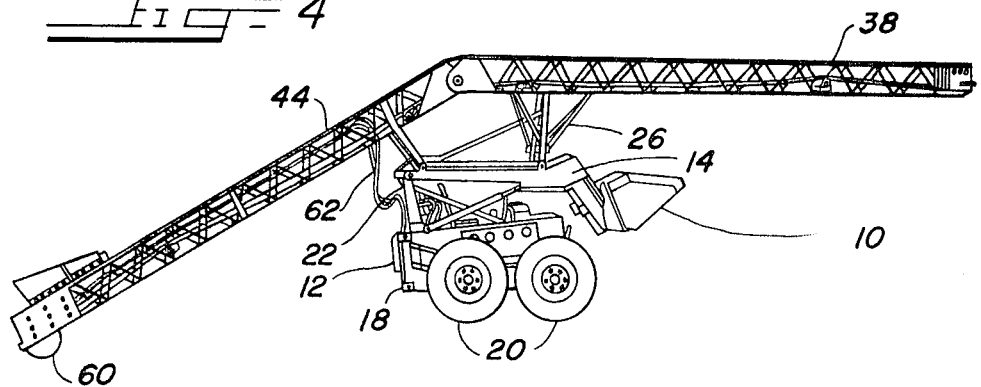
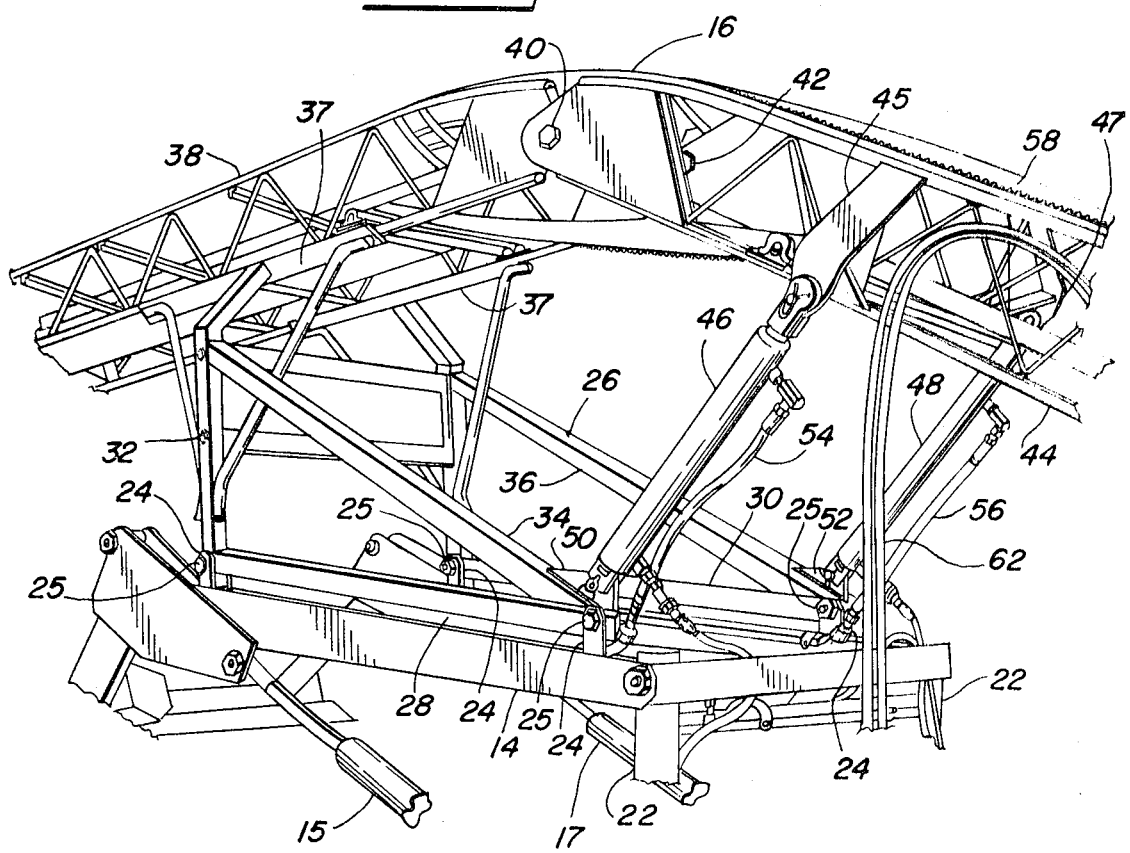

CONVEYOR UNIT MOUNTING SYSTEM

BACKGROUND OF THE INVENTION

1. Field of the Invention

This application relates to an apparatus for placing building materials or the like, and more particularly to an apparatus for placing building materials at locations that are inaccessible or difficult to reach.

2. Description of the Prior Art

In recent years conveyors have found increasing usefulness in placement of building materials and other conveyable materials. Illustrative of a number of prior art systems heretofore known are the conveyor arrangements shown in Oury et al., U.S. Pat. Re. No. 26,298; Oury, U.S. Pat. Re. No. 26,347; Oury et al., U.S. Pat. No. 3,343,651; and applicant's copending application Ser. No. 858,298, filed Sept. 16, 1969.

Various limitations have been experienced in the prior art building materials conveyor systems. For example, the stationary systems require lengthy initial setup time before conveying operations can commence, and once the area of coverage of the discharge conveyor has been filled, the stationary system must be dismantled and moved to allow conveying in another area. Thus, the prior art stationary conveyor systems, even though a great improvement over the prior techniques of conveying building materials and pouring concrete, nonetheless have disadvantages over a more mobile conveyor system.

The applicant's copending application, Ser. No. 858,298, filed Sept. 16, 1969, attempts to eliminate some of the problems incident to the stationary conveyor systems. In this application, a preferred embodiment shows a telescopical conveyor system mounted on a boom crane truck. This system permits lateral extension of the conveyor system as well as horizontal rotation to increase the area of discharge coverage. Moreover, this system is much more flexible since the boom crane truck provides its own means of propulsion from one point to another. Thus, once conveying in one area is complete, the boom crane truck and attached conveyor system can be driven to another area and conveying commenced much more rapidly than in the prior art stationary systems.

However, even though the boom crane mounted conveyor system provides obvious advantages over the prior art, it is not entirely suitable for all construction operations. For example, the boom crane vehicle is necessarily quite large and bulky and as a result this system requires a relatively open uncongested area to be utilized. Moreover, since the acceptance point of the boom crane mounted conveyor system is many feet above ground level a feeder conveyor is needed to convey the material from a source(e.g., a concrete mixer) up to the boom crane mounted conveyor system. Thus, there must be sufficient uncongested space for the feeder conveyor as well as the boom crane mounted conveyor system.

The present invention provides a small, flexible, self-contained building material conveyor system which permits operation in relatively congested areas, and further permits operations in situations where structural limitations would preclude prior art conveyor systems from operating. For example, the present invention may be utilized to convey building materials from a lower point to a higher point, or from a higher point to a lower point, or from two points of equal distance from ground level. This flexibility in conveying operations as well as the ease with which the present invention can be moved from point to point presents substantial advantages over the prior art conveyor systems. Further, this conveyor system is particularly suitable to be utilized as a feeder conveyor in conjunction with applicant's invention described in copending application Ser. No. 858,298, filed Sept. 16, 1969, since this invention as well as the invention described in applicant's copending application provide a self-contained means for propulsion.

SUMMARY OF THE INVENTION

The foregoing and other advantages and features of the subject invention may be achieved with an apparatus for placing building materials by the operable combination of a base vehicle; a supporting structure mounted on the base vehicle and adapted for pivotal movement about a horizontal axis; means to pivot the supporting structure about the horizontal axis; a conveyor unit mounting structure rigidly attached to the supporting structure; a first conveyor support frame mounted on the mounting structure adjacent its first end; a second conveyor support frame pivotably attached at its first end to the first end of the first conveyor frame; an extending means for pivoting the second conveyor support frame relative to the first conveyor support frame; a mechanically spliced conveyor belt supported by the first and second conveyor support frames for receiving material at the second end of the second conveyor and conveying and discharging the material at the second end of the first conveyor. With this arrangement, the second end of the first conveyor frame can be moved through an arc centered at the pivot point of the base vehicle and support structure, and the second conveyor can be pivoted through an arc relative to the pivot junction of the first and second conveyor frames.

Thus, it is an object of the present invention to provide a flexible compact self-propelled conveyor system for conveying concrete mix and the like.

It is a further object of the present invention to provide a conveyor system capable of being flexed at approximately its center so that material can be conveyed from a multitude of elevations to a multitude of elevations.

Another object of the present invention is to provide a compact easily transportable conveyor system for feeding larger, bulkier and less flexible conveyor systems.

DESCRIPTION OF THE DRAWING

FIG. 4 11 a side elevational view of a vehicle-mounted conveyor system in accordance with the present invention showing another possible configuration of the conveyor system.

FIG. 5 is a fragmentary perspective view of the conveyor system mounting structure.

DETAILED DESCRIPTION OF THE PREFERRED EMBODIMENTS

Figure 1:
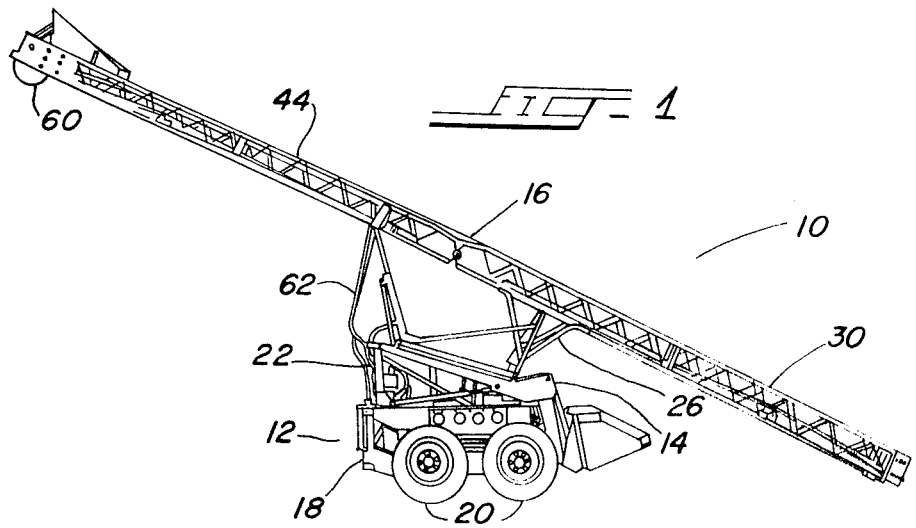
FIG. 1 is a side elevational view of a vehicle-mounted conveyor system in accordance with the present invention showing one possible configuration of the conveyor apparatus.
Figure 3:
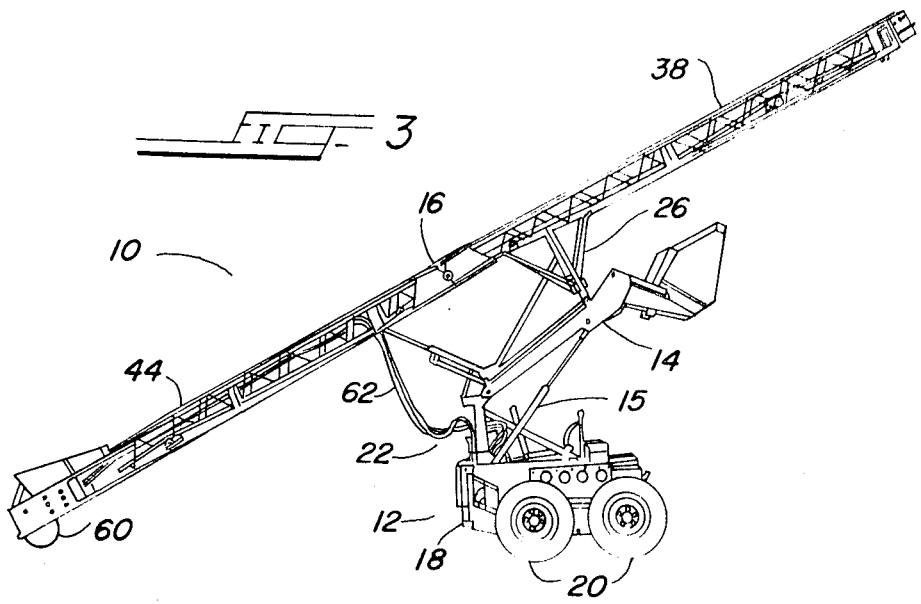
FIG. 3 is a side elevational view of a vehicle-mounted conveyor system in accordance with the present invention showing another possible configuration of the conveyor system.
Figure 2:
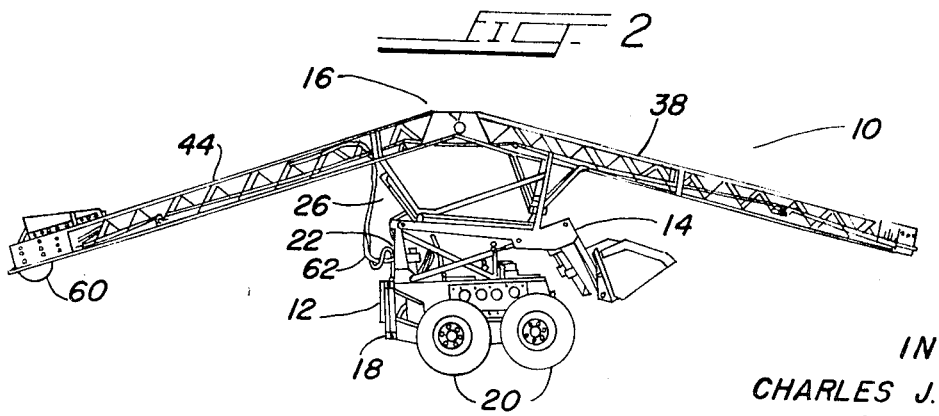
FIG. 2 is a side elevational view of a vehicle-mounted conveyor system in accordance with the present invention showing another possible configuration of the conveyor apparatus.

With reference to the drawings, FIGS. 1, 2, 3, and 4 show a building material placement apparatus 10 comprising a base 12, a supporting assembly 14, and a conveyor assembly 16.

The base 12 advantageously takes the form of the front-loading tractor which is old in the art per se and itself forms no part of the present invention. The base 12 is mobile with a self-contained power and propulsion system.

More specifically, base 12 comprises a body portion 18 mounted on axles (not shown) on which are provided wheels 20. At the rear portion of the base 12 is a vertical support member 22. Pivotally attached at the upper portion of the vertical support member 22 is supporting assembly 14. Pivotally attached to base 12 and supporting assembly 14 are supporting assembly hydraulic jacks 15 and 17 (more clearly shown in FIG. 5).

Welded to supporting assembly 14 are clevices 24 (shown in FIG. 5). Mounted to clevices 24 by machine bolts 25 is conveyor mounting assembly 26. Conveyor mounting assembly 26 comprises side channels 28 and 30 mounted to clevices 24 by machine bolts 25. Vertical frame 32 is attached to side channels 28 and 30. Struts 34 and 36 are attached to vertical frame 32 and side channels 28 and 30 respectively, and hold vertical frame 32 in a rigid perpendicular position with respect to side channels 28 and 30. Attached to the upper end of vertical frame 32 is a mounting platform 37.

Rigidly affixed to mounting platform 37 on top of vertical frame 32 is first conveyor frame 38. Pivotally mounted to the end of the first conveyor frame by machine bolts 40 and 42 is second conveyor frame 44. Pivotally mounted to the sides of conveyor frame 44 are hydraulic jacks 46 and 48. Hydraulic jacks 46 and 48 are pivotally attached at their other ends to clevices 50 and 52 mounted on struts 34 and 36 respectively. Hydraulic pressure is provided to hydraulic jacks 46 and 48 by hydraulic lines 54 and 56 from a self-contained power source (not shown) on base 12.

A mechanically spliced conveyor belt 58 rides on and is supported by both the first and second conveyor frames 38 and 44. A hydraulic conveyor belt drive motor 60 is provided on the second conveyor frame 44 at the end opposite the point of attachment to first conveyor frame 38. Hydraulic line 62 provides power from the self-contained power source (not shown) on base 12 to the hydraulic conveyor belt drive motor 60.

To position the building material placement apparatus 10 of the present invention in the desired configuration to convey material, base 12 is driven to an appropriate position immediately adjacent the point to which the material is to be conveyed. Hydraulic power is supplied the supporting assembly hydraulic jacks 15 and 17 to pivot supporting assembly 14 in a vertical plane. As supporting assembly 14 pivots, the discharge end of the first conveyor frame 38 is also moved through an arc centered at the pivot point of supporting assembly 14 and vertical support member 22. By elevating the discharge end of first conveyor frame 38 to the desired elevation and moving base 12, the discharge end of first conveyor frame 38 can be positioned above the area where the material is to be discharged. Once in this position, hydraulic jacks 46 and 48 can be actuated to either raise or lower the receiving end of second conveyor frame 44 to the desired elevation to receive the building materials from an appropriate source (e.g., a delivery truck such as a concrete mix truck). As FIG. 1, 2, 3, and 4 demonstrate, a variety of relative positions of the acceptance and discharge end of the conveyor assembly 16 can be achieved. Once in the desired position, power may be supplied to the hydraulic conveyor belt drive motor 60 to move the conveyor belt 58 in endless motion across the conveyor assembly 16. Building materials supplied to the receiving end of second conveyor frame 44 are conveyed to the discharge end of first conveyor frame 38 and discharged at this point.

Another feature of the present invention is that conveyor assembly 16 can be easily removed from base 12 and supporting assembly 14 by removing the bolts 25 at clevices 24, detaching hydraulic lines 54, 56 and 62 and lifting the conveyor assembly 16 and conveyor mounting assembly 26 from the supporting assembly 14. This permits base 12 to be used for other purposes at the construction site when not needed to convey concrete mix. Thus, in the present embodiment, the base 12 could be utilized to excavate a construction site and then with conveyor assembly 16 mounted thereon it could be utilized to pour the foundation and other structural portions of the building to be constructed

What is claimed is:

1. A conveyor system for conveying concrete mix and the like comprising:
    a base;
    a supporting structure pivotally mounted to the base;
    a means for pivoting the supporting structure about a horizontal axis through the point that the supporting structure is mounted to the base;
    a mounting assembly attached to and extending away from the supporting structure;
    first conveyor frame rigidly mounted on the mounting assembly adjacent the first end of the first conveyor frame;
    a second conveyor frame pivotally mounted at first end of the second conveyor frame to the first end of the first conveyor frame;
    an extension means for pivoting the second conveyor frame relative to the first conveyor frame independently of the pivoting of the supporting structure about a horizontal axis at the point the second conveyor frame is mounted to the first conveyor frame;
    a conveyor belt mounted on the first and second conveyor frames, and
    a means to drive the conveyor belt in endless movement on the first and second conveyor frame, whereby the second end of the first conveyor frame can be elevated relative to the base by actuation of the means for pivoting the supporting structure and the second end of the second conveyor frame can be elevated relative to the base by actuation of the extension means to pivot the second conveyor frame relative to the first conveyor frame.

2. A conveyor system as claimed in claim 1, wherein the base is a self-propelled vehicle.

3. A conveyor system as claimed in claim 2, wherein the self-propelled vehicle has a self-contained hydraulic power system.

4. A conveyor system as claimed in claim 3, wherein the means to pivot the supporting structure and the extension means are hydraulic jacks powered by the self-contained hydraulic power system.

5. A conveyor system as claimed in claim 3, wherein the means to drive the conveyor belt is a hydraulic motor powered by the self-contained hydraulic power system.

6. A conveyor system as claimed in claim 1, wherein the mounting assembly comprises:
    first and second side channels;
    a means to attach the first and second side channels to the supporting structure;
    a vertical frame attached at one end to the first and second side channels;
    a mounting platform means attached to the opposite end of the vertical frame for mounting and supporting the first conveyor frame; and
    a first strut and a second strut each attached at one of its ends to the end of the first and second side channels opposite the end to which the vertical frame is attached and attached at its opposite ends to the vertical frame adjacent the mounting platform means.

7. A conveyor system as claimed in claim 6, further comprising means for removing the first and second side channels from the supporting structure to allow the mounting assembly to be removed from the supporting structure.

* * * * *

PO-1050
(5/69)

UNITED STATES PATENT OFFICE
CERTIFICATE OF CORRECTION

Patent No. 3,623,597     Dated January 4, 1972

Inventor(s) Edmund J. Gaughan

It is certified that error appears in the above-identified patent and that said Letters Patent are hereby corrected as shown below:

Column 5, Formula should read:

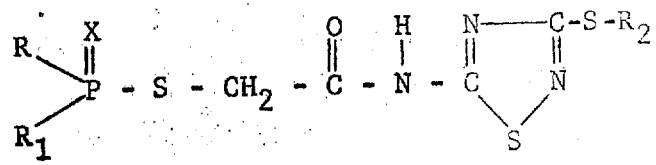

Claim 1, Formula should read:

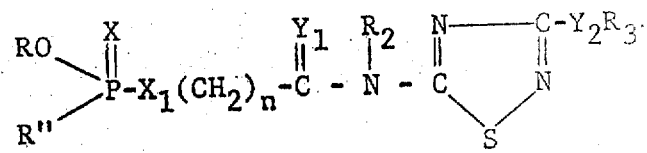

Signed and sealed this 21st day of August 1973.

(SEAL)
Attest:

EDWARD M. FLETCHER, JR.         RENE D. TEGTMEYER
Attesting Officer                Acting Commissioner of Patents